Oct. 26, 1965  E. H. SHARP  3,214,027
DUNNAGE DEVICE
Filed Dec. 23, 1963  3 Sheets-Sheet 1

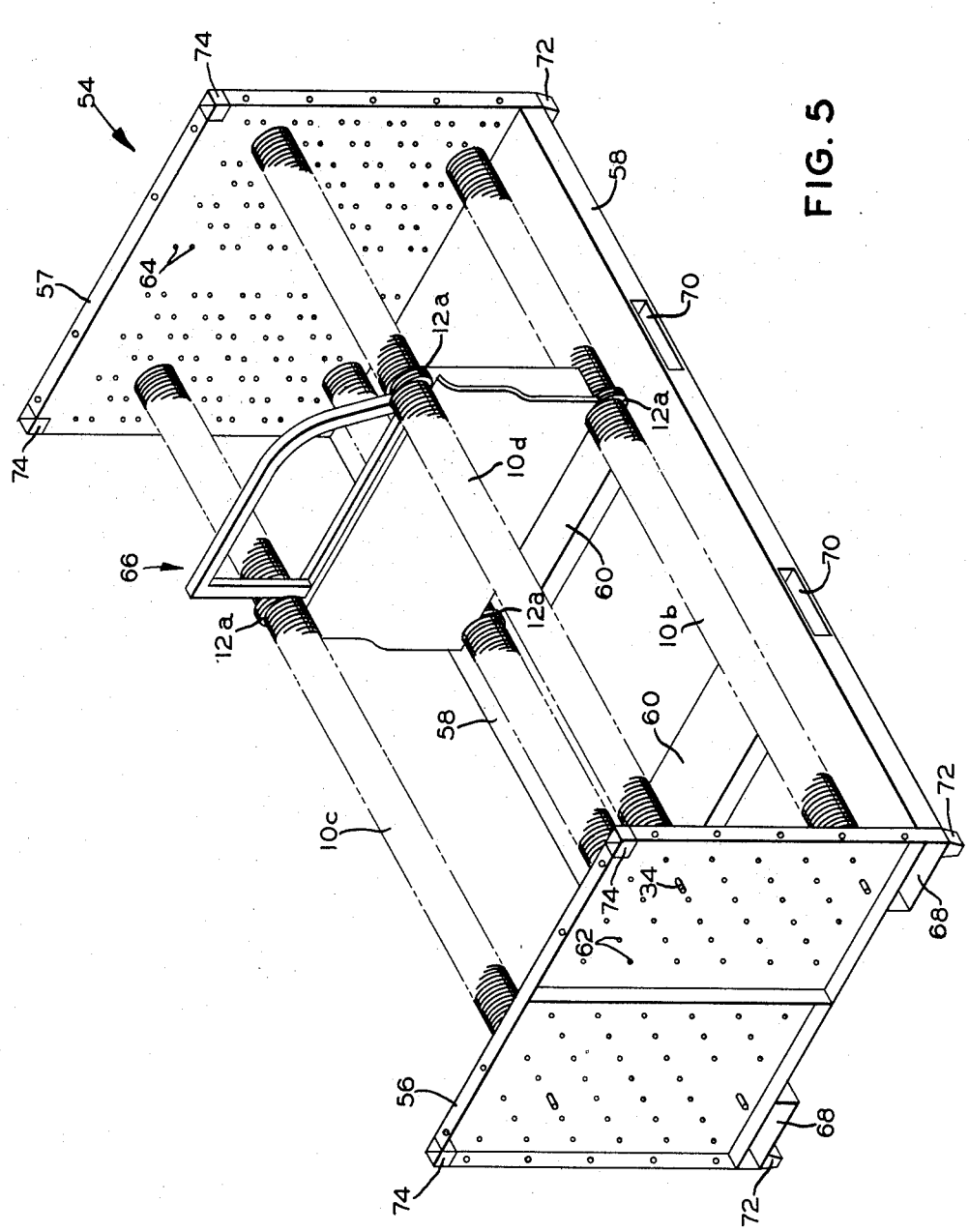

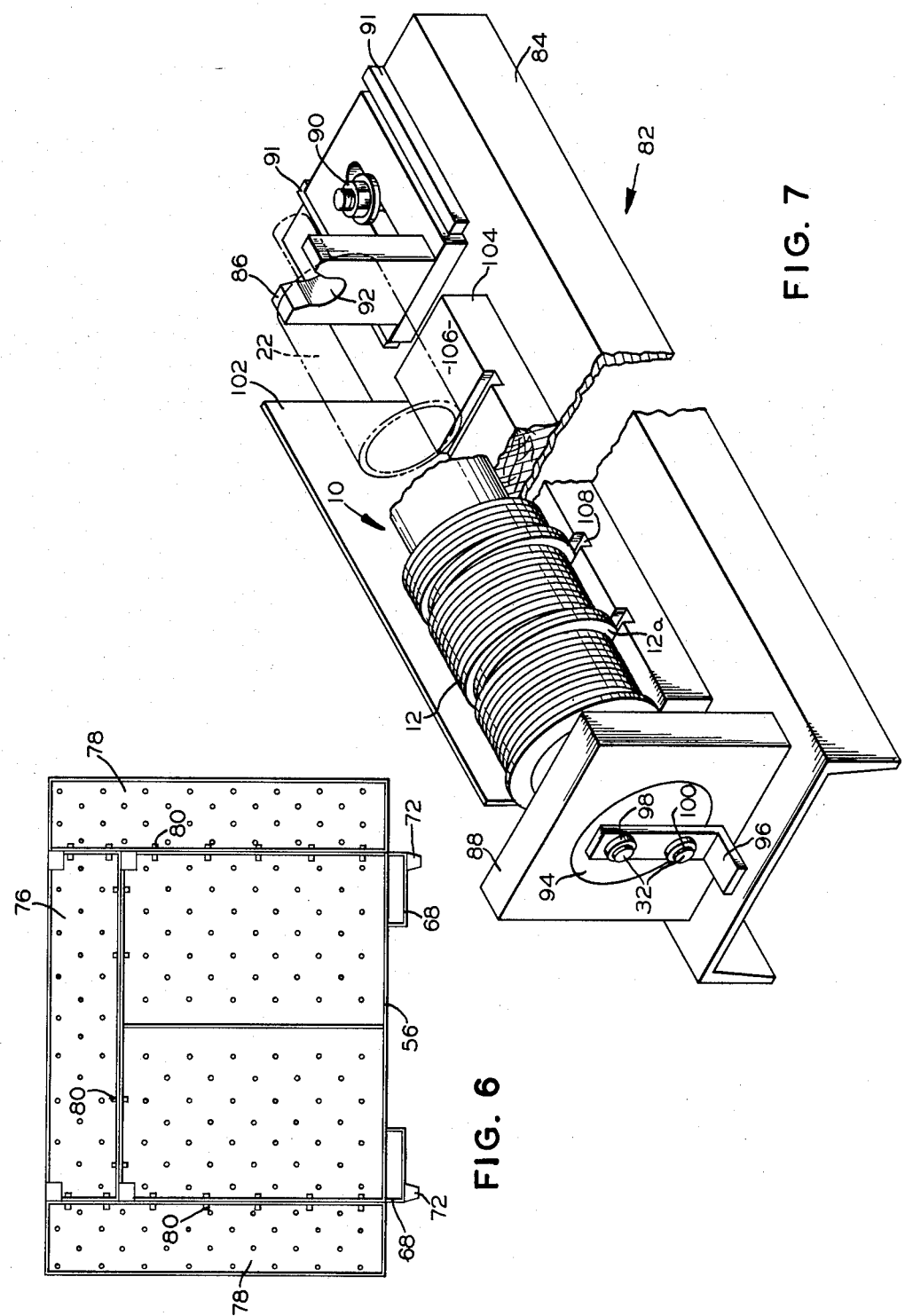

United States Patent Office 3,214,027
Patented Oct. 26, 1965

3,214,027
DUNNAGE DEVICE
Everett H. Sharp, Rochester, Mich., assignor to Dana Corporation, Toledo, Ohio, a corporation of Ohio
Filed Dec. 23, 1963, Ser. No. 332,625
12 Claims. (Cl. 211—13)

The present invention relates generally to loading, storing, and transporting means for lading for use in storage areas or in lading hauling vehicles such as ships, airplanes, railroad cars, highway trucks and the like. More specifically, the invention relates to dunnage devices adapted to supportingly engage items of lading.

Very often articles of lading cannot be left in a loose condition simply resting on each other and on the lading supporting surface. This is particularly true where the lading is in a movable conveyance where there is the possibility that the lading, no matter how heavy, will move about causing injury to itself or to the conveyance means.

Dunnage devices are relatively old in the art and have been made in a multitude of manners and of numerous materials to be used to brace the articles of lading carried thereby against movement relative to the surface upon which they are supported and relative to each other. Lading supporting members as conventionally used for this purpose have been constructed to that they can be fixed in certain positions relative to the supporting surfaces so that they will resist shifting of the articles. In order for the dunnage device to properly support the item of lading, the item of lading and the surface of the dunnage device have been provided with means that cooperate to achieve the result.

However, such prior art devices require numerous differing dunnage devices to cooperate with and properly support the wide variation in the shape and size of various items of lading.

It is, therefore, an object of this invention to provide a dunnage device which is suitable for use with a multitude of shapes and sizes of items of lading.

It is another object of this invention to provide a dunnage device which includes means for adjusting the profile thereof whereby the same may easily be adapted to accommodate a variety of shapes and sizes of items of lading.

It is yet another object of htis invention to provide a dunnage device which may be used in a storage area or on a mode of conveyance to properly support items of lading.

It is a yet further object of this invention to provide such a dunnage device wherein the profile thereof which contacts items of lading includes means adapted for the variation of the contacting surface so that the same can supportingly engage a variety of shapes and sizes of items of lading.

Another object of this invention is to provide a dunnage device adapted to be adjustably secured to a conveying structure in a plurality of positions, which device includes means whereby the contacting surface thereof may be varied in its contour so that many shapes and sizes of items of lading can be properly supported thereby.

These and other objects will become apparent upon a consideration of the following specification when taken in conjunction with the drawings, wherein:

FIG. 5 is an isometric view of the assembly shown in FIG. 4 with an item of lading supported thereby;

FIG. 6 is an end elevational view of another embodiment of the supporting device of FIGS. 4 and 5, and FIG. 7 is an isometric view of the dunnage device of FIG. 1 cooperating with an adjusting means.

In a preferred embodiment of this invention, a dunnage device in the form of a shaft having a plurality of juxtaposed shims slidably received thereon is prepared so that the shims are adapted for radial displacement relative to the shaft thereby varying the profile thereof and also includes means for securing the desired displacement of the shims. In this manner the surface of the dunnage device may be radially adjusted along its length so that the profile thereof may be varied in accordance with the needs dictated by the items of lading to be supported thereby. The lateral extremities of the dunnage means are provided with means for securing the same to a supporting structure. The supporting structure may take the form of a movable rack adapted to receive the dunnage device and the items of lading being supported thereby for storage and being further adapted to be carried on a mode of conveyance for transportation. Means may also be provided on the mode of conveyance itself for supporting the dunnage device so that the supporting rack may be eliminated if desired.

The shims for use on the dunnage means may take the form of a member having a substantially symmetrical central opening of a greater diameter than the external diameter of the shaft supporting the same. In this manner radial displacement in all directions of the shims relative to the shaft is easily accommodated by the difference in diametrical size of the shims and shaft. Another manner of forming the shims is to provide an opening therein which includes a minor and a major axis, the minor axis being substantially equivalent in diameter to the shaft, while the major axis being greater than the diameter of the shaft, so that radial displacement in the direction of the major axis is easily accomplished. To achieve radial displacement in other directions relative to the supporting shaft, the shim need merely be revolved circumferentially to reposition its major axis and then displaced radially along its major axis to achieve the desired radial displacement relative to the supporting shaft.

Figure 1:
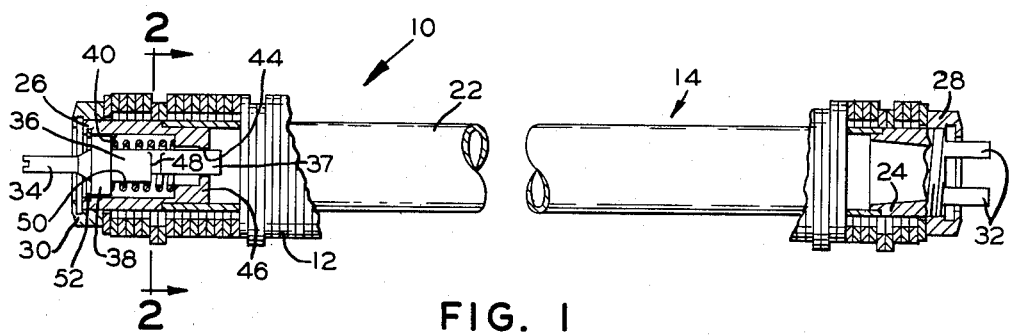
FIG. 1 is a longitudinal view of a dunnage device incorporating this invention shown partially in section and with parts omitted for added clarity.
Figure 2:
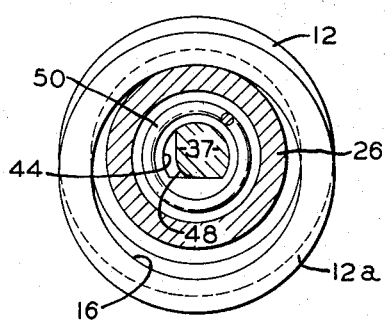
FIG. 2 is a view taken along the lines 2—2 of FIG. 1.

Referring to the drawings, a dunnage device shown generally at 10 includes a plurality of shims 12 slidably mounted on substantially the full length of a hollow shaft means shown generally at 14. As best seen in FIG. 2, the shims 12 are provided with a symmetrical central opening 16 which receives, and is of greater diameter than, the shaft means 14, while in FIG. 3, the shims 13 are formed with a central opening having a major and a minor axis 18 and 20; the major axis 18 being greater in length than the diameter of the shaft means 14, while the minor axis 20 is substantially equal or slightly greater than the diameter of the shaft means.

The shaft means 14 includes a hollow tube 22 and a pair of inserts 24 and 26 pressed into opposite ends thereof and suitably secured thereto as by welding. Each insert 24 and 26 threadedly receives thereon a bushing 28 and 30 respectively, which bushings are adapted to be threaded into secure abutting relationship with the shims 12, thereby pressing the same together into a fixed position relative to the shaft means 14.

The insert 24 has a pair of spaced projections 32 extending axially therefrom in a fixed relationship, while the insert 26 has a projection means 34 extending axially therefrom in an axially movable relationship. More particularly, the projection means 34 includes a plunger portion 36 received in the insert 26 and a pilot portion 37. The plunger 36 has an annular flange 38 slidably engaging a large axially extending bore 40 in the insert 26 and the pilot 37 formed integrally with the plunger is slidably received in a small bore 44 provided in a wall 46 formed on the inner end of the insert. As best seen in FIG. 2, the pilot 37 and the bore 44 are semicircular in cross section and the pilot is provided with a chordal slot 48 equal in width to the wall 46 so that when the projection means 34 is moved axially into the insert 26 until the slot 48 is in registration with the wall 46 at the bore 44, mere rotation of the projection means 34 will lock the wall 46 in the chordal slot 48 and fixedly position the projection means inwardly.

A spring 50 is compressed between the flange 38 and the wall 46 and constantly biases the projection means 34 axially out of the bushing 26 so that when the slot 48 is not engaging the wall 46, the spring urges the projection means 34 axially outwardly until the flange 38 engages a snap ring 52 carried by the insert 26 adjacent the open end thereof.

The dunnage device as above described is adapted to be carried by a support means. The support means may be formed in a conveyance means itself or may take the form of a dunnage rack shown generally at 54. The dunnage rack includes a pair of opposed, spaced, end panels 56 and 57 interconnected at their base by a plurality of spaced structural members 58. The structural members 58 are further interconnected by a pair of structural cross members 60 whereby the end panels are rigidly and securely supported in spaced relationship.

The end panel 56 is provided with a plurality of spaced openings 62 adapted to removably receive the projection means 34, and the end panel 57 is provided with a plurality of paired spaced openings 64 adapted to removably receive the paired projection means 32. The openings 62 and 64 may be formed in a mode of conveyance itself if desired. The projection means 32 are provided in a paired relationship so that upon their insertion in the openings 64, the dunnage device will be fixed against rotation. To remove the dunnage device 10, the projection means 34 is merely pressed into the insert 26 against the bias of the spring 50 and rotated to secure the wall 46 in the slot 48, so that the projection means 34 are removed from the openings 62 and the device can be lifted to remove the projections 32 from the openings 64. When the device is repositioned in the rack 54 with the projections 32 in the openings 64 and the projection means 34 aligned with the openings 62, the projection means is rotated to unlock the wall 46 from the slot 48 so that the spring 50 biases the projection means into the opening 62, whereby the rack 54 is adapted to support the dunnage device 10 and the items of lading such as a vehicle door shown generally at 66.

The rack 54 may be used in a free standing condition for storage or may be lifted and transported by a lift truck by inserting the forks thereof in a pair of slots 68 formed in the base of the end panels 56 and 57 or in a pair of slots 70 formed in the structural members 58 and 60. Also the rack 54 may be placed on a conveyance such as an airplane, highway truck, ship or railway car for longer range transportation. Accordingly, the rack 54 is provided with a plurality of nesting plugs 72 formed on the lower corners of the end panels 56 and 57, which plugs are adapted to cooperate with receiving means in the conveyance deck (not shown) in a well known manner. The top corners of the panels 56 and 57 are provided with nesting plug receiving openings 74 which are adapted to receive the nesting plugs 72 of a superimposed rack 54 so that secure stacking of the racks can be attained. If the width or height of the end panels 56 and 57 is insufficient, then extension panel portions 76 and 78 may be added to the top and sides respectively of the end panels and suitably secured thereto as by a plurality of bolt means 80.

Figure 3:
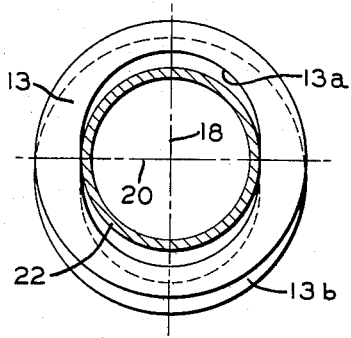
FIG. 3 is a view according to FIG. 2 of another embodiment of this invention.
Figure 4:
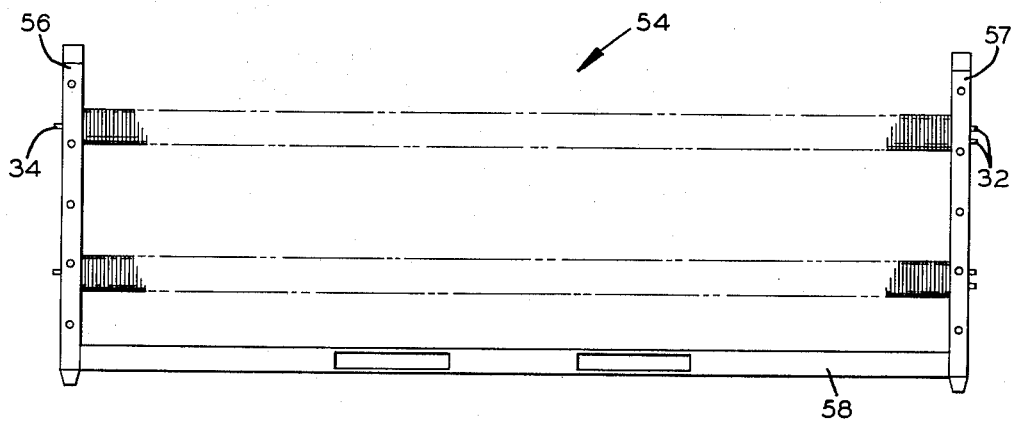
FIG. 4 is a side elevational view of the dunnage device of FIG. 1 mounted in a supporting device.

Since the shims 12 have larger bores 16 then the diameter of the shaft means 14 and the bores 13a of the shims 13 have major axes greater than the diameter of the shaft means, the shims may be displaced from a concentric position relative to the shaft means to take a radially displaced position as shown in FIG. 2 by the shim 12a or in FIG. 3 by the shim 13b, thereby displacing the profile of the device 10. FIG. 7 discloses means for displacing the desired shims 12a or 13b of a dunnage device 10 from a concentric relationship relative to the shaft means 14 which is occupied by the remainder of the shims 12 or 13. More particularly, a set up means shown generally at 82 includes a base plate 84 having a pair of upright, spaced opposed end plates 86 and 88 attached thereto; the end plate 86 being positionably attached by a nut and stud assembly 90 and slidable within a pair of parallel ways 91, while the end plate 88 is fixedly attached in a suitable manner.

The end plate 86 is provided with a slot 92 formed medially in the top thereof which is adapted to rotatably receive the projection means 34, while the end plate 88 rotatably mounts a bushing 94. The bushing 94 is provided with a bell crank 96 suitably secured to a pair of spaced bosses 98, which bosses are provided with central openings 100 adapted to receive the parallel projections 32. A straight back plate 102 is secured to the base plate 84 and positioned so that when the shims 12 and 12a of the dunnage device 10 are forced against the same, they will not be transversely displaced relative to the shaft means 14.

A removable template 104 is positioned on the base plate 84 below the dunnage device 10 and includes a plurality of land areas 106 and grooves 108. The land areas 106 are dimensioned so that when the bushings 28 and 32 are moved from engagement with the shims 12, the shims rest against the land areas and will not be vertically displaced relative to the shaft means 14. The groove areas 108 are displaced below the land areas and are of a sufficient width and depth so that the desired amount of vertical displacement of the loose selected shims 12a, relative to the shaft means 14 will be attained as dictated by the items of lading to be supported by the dunnage device 10. When all the shims have been positioned as desired, the bushings 28 and 30 are again tightened to fixedly secure the shims 12 relative to the shaft means 14. By rotating the bell crank 96, the dunnage device can be circumferentially positioned so that the radial displacement relative thereto is along the desired radius. When using the shims 13, the same must be rotated relative to the shaft means 14 to place the major axes thereof in the direction of the desired radial displacement. If desired, the space between the shaft means 14 and all the shims 12 and 13 may be filled with a resilient material, such as an elastomeric compound, so that the radially displaced shims 12a and 13b will return to a centralized position upon release of the bushings 28 and 30 from the shims.

In FIG. 5, the dunnage devices 10a and 10b are supporting the lower portion of the door 66, while the dunnage devices 10c and 10d are engaging an upward portion of door 66 so that the same maintain the door secured against both vertical and transverse movement. The necessary shims 12a have been displaced relative to the dunnage devices to provide a notched profile therein to securedly maintain the door 66 against lateral tilting. It is apparent that with the devices 10a, 10b, 10c and 10d engaging the door 66 as shown, the same is maintained in an immobile condition relative to the dunnage devices and any other item of lading carried thereby. It is also apparent that the shims 12a may be displaced to form the desired number of notches at the desired interval and radial displacement relative to the dunnage devices and that the dunnage devices may be positioned as required in a supporting means so that many shapes and sizes of items of lading may be satisfactorily supported thereby.

While this invention has been described in the above embodiments, it is apparent that many changes in structure can be made without departing from the scope of this invention as defined by the following claims.

What is claimed is:
1. A dunnage device adapted to be secured to a support means comprising in combination,
   (1) an elongated shaft means,
   (2) profile means carried externally by said shaft means and including a plurality of portions independently radially movable relative to said shaft means,
   (3) means carried by one of said above means and being operative to alternately secure and release said profile means relative to said shaft means whereby the profile of said dunnage device is operable to be securely adjusted,
   (4) support means including engaging means,
   (5) and projecting means telescopically carried by said shaft means and operative to alternately engage and disengage said engaging means of said support means respectively upon axial movement away from and toward said shaft means whereby said shaft means may alternately be secured to and released from said support means.

2. A dunnage device adapted to be secured to a support means comprising in combination,
   (1) an elongated shaft means,
   (2) profile means carried externally by said shaft means and including a plurality of portions independently radially movable relative to said shaft means,
   (3) means carried by said shaft means and being operative to alternately secure and release said profile means relative to said shaft means whereby the profile of said dunnage device is operable to be securedly adjusted,
   (4) support means including engaging means,
   (5) a first projecting means carried by one end of said shaft means and operative to engage some of the engaging means of said support means in a non-rotating relationship,
   (6) the other end of said shaft means having an axial opening,
   (7) and a second projection means including a portion adapted to project from said shaft means and a portion telescopically received in the opening in said shaft means and operative to alternately engage and disengage said engaving means of said support means respectively upon axial movement away from and toward said shaft means whereby said shaft means may alternately be secured to and released from said support means.

3. A dunnage device adapted to be secured to a support means as defined by claim 2 including resilient means biasing said second projection means away from said shaft means whereby the same biases said second projection means into engagement with said support means.

4. A dunnage device comprising in combination
   (1) an elongated shaft means,
   (2) profile means carried externally by said shaft means and including a plurality of portions independently radially movable relative to said shaft means,
   (3) and means carried by said shaft means and being operative to alternately secure and release said profile means relative to said shaft means whereby the profile of said dunnage device is operable to be securely adjusted.

5. A dunnage device having an adjustable profile comprising in combination
   (1) an elongated shaft means,
   (2) a plurality of shim means each having an opening therein and being slidably received on said shaft means so that the periphery of said shim means determines the profile of said dunnage device,
   (3) said opening being larger in cross sectional area than the cross sectional area of said shaft means and being radially movable relative thereto,
   (4) and means adjustably carried by said shaft means and operative to positionably engage said shim means and secure the same relative to each other and to said shaft means whereby the profile of said dunnage device may be securedly adjusted.

6. A dunnage device having an adjustable profile comprising in combination,
   (1) an elongated shaft means,
   (2) a plurality of shim means each having an opening therein and being slidably received on said shaft means,
   (3) said opening having at least one axis greater in length than and the remainder of the axes at least as great in length as the diameter of said shaft whereby said means are operative to be radially displaced relative to said shaft means at least in the direction of said one axis,
   (4) and means adjustably carried by said shaft means for securing the position of said shim means relative thereto and to each other whereby the profile of said dunnage device may be securedly adjusted.

7. A dunnage device having an adjustable profile comprising in combination,
   (1) an elongated cylindrical shaft means,
   (2) a plurality of annular shims having a central opening therein of a larger diameter than said shaft means,
   (3) said shims being slidably received on said shaft means and disposed in juxtaposed relationship so that the periphery thereof determines the profile of said dunnage device,
   (4) and adjustable means carried by said shaft means and operative to alternately securedly engage and disengage at least one shim of said plurality of shims,
   (5) whereby upon the secured engagement of said adjustable means with said one shim means said plurality of shim means are securedly positioned relative to said shaft means and to each other and upon disengagement of said adjustable means with said one shim means said plurality of shim means are operative to move radially relative to said shaft means and to each other thereby varying the profile of said dunnage device.

8. The combination with a dunnage device including an elongated shaft means, profile means carried externally by said shaft means, said profile means including a plurality of portions independently radially movable relative to said shaft means, and means carried by said shaft means and being operative to alternately secure and release said profile means relative to said shaft means whereby the profile of said dunnage device is operable to be securedly adjusted, of means for positioning the profile of said dunnage device when said securing means have released said profile means, said positioning means including means for supporting the ends of said dunnage device, and template means for radially positioning said profile means relative to said shaft means whereby when said securing means secures said profile means relative to said support means the desired profile of said dunnage device is obtained.

9. Means for maintaining items of lading in a supported relationship with respect to a transporting media comprising
   (1) a pair of spaced upright supported members between which the lading is adapted to be positioned,
   (2) a plurality of lading engaging members supported by said support members and each including
      (a) an axially elongated shaft means,
      (b) a plurality of shim means carried by said shaft means and being radially movable relative thereto and to each other to form lading engaging grooves, and
      (c) means for securing said shim means in a selected relationship relative to said shaft means and to each other, (3) whereby said lading engaging members are operable to support lading of various shapes, sizes and contours during transit.

10. Means for maintaining items of lading in a supported relationship with respect to a transporting media comprising
(1) a pair of spaced upright support members between which the lading is adapted to be positioned,
(2) a plurality of lading engaging members,
(3) means on said support members and means on said lading engaging members cooperable with each other whereby said lading engaging members are selectively positioned in any of a plurality of positions with respect to said support members,
(4) said lading engaging members having an adjustable profile adapted to engage lading and including
   (a) an elongated shaft means,
   (b) profile means including a plurality of individual elements each having an opening therein larger in cross-sectional area than the cross-sectional area of said shaft means,
(5) said shaft means being disposed in said openings and being radially movable relative thereto, and
(6) securing means carried by one of said above means for securing the radial position of said profile means relative to said shaft means whereby the profile of said lading engaging members are operative to be securedly adjusted.

11. Means for maintaining items of lading in a supported relationship with respect to a transporting media comprising
(1) a pair of spaced upright support members between which the lading is adapted to be positioned,
(2) a plurality of lading engaging members,
(3) means on said support members and means on said lading engaging members cooperable with each other whereby said lading engaging members are selectively positioned in any of a plurality of positions with respect to said support members,
(4) said lading engaging members having an adjustable profile for engaging the items of lading and including
   (a) a plurality of shims disposed in a side by side relationship,
   (b) means carrying said shims with said shims being movable relative to each other and to said carrying means for forming lading engaging grooves, and
   (c) means for fixedly securing said shims in a selected relationship.

12. The lading supporting device as defined in claim 11 wherein said last named means is adjustably carried by said carrying means for alternately allowing said shims to move relative to each other and to secure said shims in a selected relationship.

References Cited by the Examiner

UNITED STATES PATENTS

| | | | |
|---|---|---|---|
| 1,893,227 | 1/33 | Cohen-Venezian | 280—179 |
| 2,612,848 | 10/52 | Sowden | 105—369 |
| 2,826,788 | 3/58 | Graham | 20—35 |
| 2,912,939 | 11/59 | Miner | 105—369 |
| 3,022,896 | 2/62 | Dew | 211—13 |
| 3,051,099 | 8/62 | Robertson | 105—369 |
| 3,073,260 | 1/63 | Dunlap | 105—369 |
| 3,074,740 | 1/63 | Zastrow | 280—179 |

CLAUDE A. LE ROY, *Primary Examiner.*

FRANK L. ABBOTT, *Examiner.*